(12) United States Patent
Mavungal Noorudheen et al.

(10) Patent No.: US 12,423,090 B2
(45) Date of Patent: Sep. 23, 2025

(54) MEMORY SYSTEM FIRMWARE UPDATE USING VIRTUAL SLOTS

(71) Applicant: Micron Technology, Inc., Boise, ID (US)

(72) Inventors: Noorshaheen Mavungal Noorudheen, Long Beach, CA (US); Shalu Agrawal, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 163 days.

(21) Appl. No.: 17/941,904

(22) Filed: Sep. 9, 2022

(65) Prior Publication Data
US 2024/0004641 A1    Jan. 4, 2024

(30) Foreign Application Priority Data
Jul. 1, 2022   (IN) .............................. 202241038149

(51) Int. Cl.
*G06F 9/44*      (2018.01)
*G06F 8/654*    (2018.01)

(52) U.S. Cl.
CPC ................................. *G06F 8/654* (2018.02)

(58) Field of Classification Search
CPC ...................................................... G06F 8/654
See application file for complete search history.

(56) References Cited

U.S. PATENT DOCUMENTS

| | | | |
|---|---|---|---|
| 10,572,166 B1* | 2/2020 | Douglass | G06F 3/0623 |
| 2014/0033187 A1* | 1/2014 | Beale | G06F 8/656 |
| | | | 717/168 |
| 2014/0281587 A1* | 9/2014 | Ignatchenko | G06F 21/64 |
| | | | 713/193 |
| 2017/0060559 A1* | 3/2017 | Ye | G06F 8/65 |
| 2019/0303130 A1* | 10/2019 | M. Saeed | H04W 4/80 |
| 2020/0162539 A1* | 5/2020 | Ziv | H04L 67/06 |
| 2022/0405090 A1* | 12/2022 | Veluswamy | G06F 8/654 |

* cited by examiner

*Primary Examiner* — Hang Pan
(74) *Attorney, Agent, or Firm* — Schwegman Lundberg & Woessner, P.A.

(57) ABSTRACT

Aspects of the present disclosure configure a system component, such as memory sub-system controller, to update firmware using a virtual slot. The memory sub-system controller receives an image that includes a firmware update and performs a verification of the image. The verified firmware update is stored in a storage location on a set of memory components prior to receiving a commit request from a host. After the commit request is received from the host, a firmware slot identified by the commit request is linked to the verified image that is stored in the storage location. The memory sub-system is then booted from the firmware slot using the verified image that is stored in the storage location.

20 Claims, 7 Drawing Sheets

MEMORY SYSTEM FIRMWARE UPDATE USING VIRTUAL SLOTS

PRIORITY APPLICATION

This application claims the benefit of priority to Indian Patent Application Serial Number 202241038149, filed Jul. 1, 2022, which is incorporated herein by reference in its entirety.

TECHNICAL FIELD

Embodiments of the disclosure relate generally to memory sub-systems and, more specifically, to updating firmware in a Non-Volatile Memory Express (NVMe) memory sub-system.

BACKGROUND

A memory sub-system can be a storage system, such as a solid-state drive (SSD) or NVMe, and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
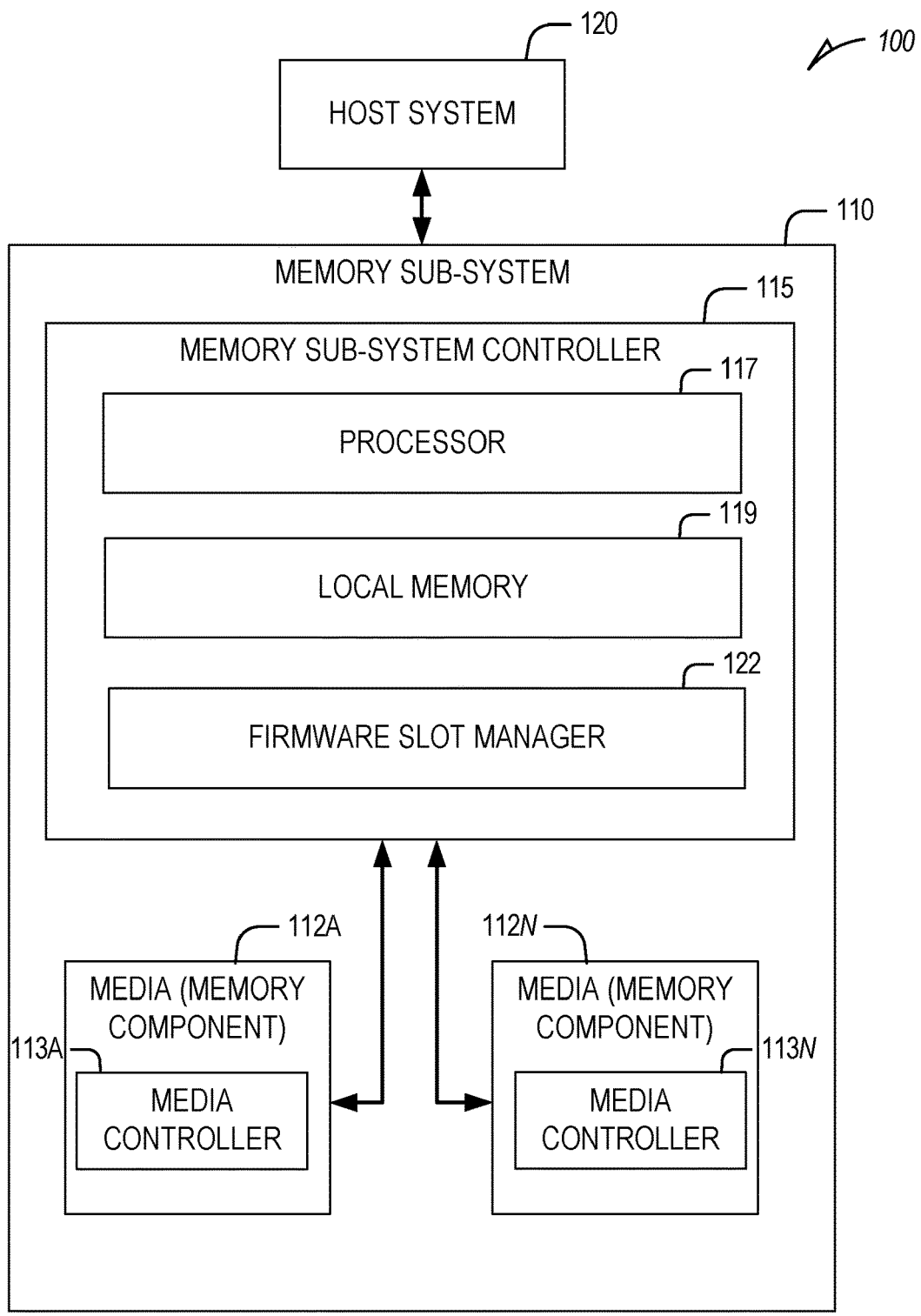
FIG. 1 is a block diagram illustrating an example computing environment including a memory sub-system, in accordance with some embodiments of the present disclosure.

Aspects of the present disclosure configure a system component, such as a memory sub-system controller, to update firmware used to control operations of the memory sub-system. An image that includes the firmware is received and verification of the image is performed. After successfully verifying the image, the image is stored in a segment of the memory sub-system. Then, a request to commit the image to an individual slot of one or more firmware slots can be received from a host device. In response to receiving the request, a link or association is stored in the individual slot that associates the individual slot with the segment of the memory sub-system in which the verified image is stored. After or during storage of the link, quiesce and transition operations are performed to activate the firmware of the image and cause the memory sub-system to reboot based on the activated firmware.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error correction code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data."

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, and so forth.

A memory device can be a non-volatile memory device. A non-volatile memory device is a package of one or more dice. Each die can comprise one or more planes. For some types of non-volatile memory devices (e.g., NAND devices), each plane comprises a set of physical blocks. For some memory devices, blocks are the smallest area than can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package. The memory device can be divided into one or more zones where each zone is associated with a different set of host data or user data or application.

Conventional memory sub-systems implement a protocol for updating a firmware of the memory sub-system. The conventional memory sub-systems include one or more firmware slots in which different versions of firmware can be stored. Another slot can be provided that identifies a current firmware version that is being used to operate the memory sub-system. In order to update the firmware that is stored in one of the firmware slots, two commands are typically received from a host device or host system. A first command is received to download the image that includes the firmware update and store the image in a temporary buffer. After the first command, a second command to commit the image to a particular one of the one or more firmware slots can be received. In response to receiving the second command, a set of operations including image verification, flash writing, quiescing, and transition bootup and resume are performed.

Performing all of these operations to activate a new firmware image in response to the commit command can take more than a maximum allowable threshold of one second. Specifically, the image verification and storage operations can take on the order of several milliseconds. Because the amount of time it takes to perform all of the operations in response to the commit command exceeds the maximum allowable threshold, timing requirements set by a standard or Open Core Protocol (OCP) specification are violated. Also, moving some of the operations from the commit stage to the download stage is non-trivial because certain information is missing in the download command, which is not available until the commit command is received, such as which slot of the one or more slots to use to store the image of the firmware. This restricts a vendor's ability to update firmware of a memory sub-system, which can result in inefficiencies in operating the memory sub-system.

Aspects of the present disclosure address the above and other deficiencies by configuring a system component, such as a memory sub-system controller of a memory sub-system, to reduce operations performed during a commit stage (in response to receiving a commit command) by performing such operations during a download stage (in response to receiving an image of firmware from a host device). Specifically, according to the disclosed embodiments, an image that includes the firmware is received and verification of the image is performed upon receiving the image. Namely, the image is verified before a commit command is received. After successfully verifying the image, the image is stored in an allocated segment of the memory sub-system. In response to subsequently receiving a request to commit the image to an individual slot of one or more firmware slots from a host device, a link or association is stored in the individual slot that associates the individual slot with the segment of the memory sub-system in which the verified image is stored. After or during storage of the link, in response to the request to commit the image, quiesce and transition operations are performed to activate the firmware of the image and cause the memory sub-system to reboot based on the activated firmware from the individual slot. In this way, the number of operations that are performed during the commit stage are reduced, which allows firmware to be updated within the maximum allowable threshold.

For instance, in some embodiments the memory sub-system controller receives an image that includes a firmware update with instructions for operating the memory sub-system. For example, the image can be received in response to receiving a NVMe download command from a host.

The memory sub-system controller, in response to receiving the image, performs a verification process on the image and stories the image in a segment of the set of memory components based on a result of performing the verification process. For example, the memory sub-system controller performs the verification process on the image by unpacking the image and applying a decryption process to check security of the image. The memory sub-system controller performs a Secure Hash Algorithm (SHA) checksum to check integrity of the image. Then, the memory sub-system controller stores the results of the verification in a verification buffer.

In some embodiments, the memory sub-system controller, after performing the verification process on the image, receives a request to commit the image, the request to commit including an identifier of a firmware slot of a plurality of firmware slots in the memory sub-system. The identifier can be a slot number of the firmware slot. The request to commit can include a NVMe commit command received from the host. The memory sub-system controller, in response to receiving the request, stores a link to the segment of the set of memory components in which the image is stored in the firmware slot identified by the request.

In some examples, as part of committing the image, the memory sub-system controller performs certain commit operations, such as performing a quiescing operation to generate a snapshot of a current firmware state being actively used to operate the memory sub-system, the snapshot including queue information and data structures associated with the current firmware. The memory sub-system controller can also perform a transition operation to write the snapshot to the firmware update and conduct hardware reset operations.

In some examples, as part of committing the image, the memory sub-system controller accesses verification data that resulted from previously performing the verification process on the image in a buffer during the download stage and checks the verification data in response to receiving the request to commit and prior to storing the link to the segment in the firmware slot.

In some examples, the memory sub-system controller stores the identifier of the firmware slot in an active slot to activate the firmware update. For some embodiments, the memory sub-system controller reboots the memory sub-system, such that, during rebooting the memory sub-system, the memory sub-system controller reads the active slot to obtain the firmware update from which to boot the memory sub-system.

In some embodiments, the image of the firmware can be received by the memory sub-system controller from the host in a plurality of separate chunks. Each chunk can be of equal or unequal size and can be received in order or out of order. In such cases, the verification process performed on the image during the download stage can be performed on each individual chunk as that respective chunk is received. For example, each chunk of the plurality of separate chunks can include security information and checksum information. The memory sub-system controller performs a first security check and a first integrity check for a first chunk of the plurality of separate chunks based on the security information and checksum information of the first chunk and stores a first result in a verification buffer in response to performing the first security check and the first integrity check. The memory sub-system controller performs a second security check and a second integrity check for a second chunk of the plurality of separate chunks based on the security information and checksum information of the second chunk and combines, in the verification buffer, the first result with a second result in response to performing the second security check and the second integrity check.

After verifying each individual chunk, the memory sub-system controller stores the plurality of separate chunks to a correct offset in the segment of the set of memory components based on a chunk number associated with each of the plurality of separate chunks. This storage can be performed as each chunk completes the verification process. In response to receiving the commit request from the host device, the verification buffer is accessed to determine whether all of the chunks were successfully verified prior to committing the image including all of the chunks to the specified firmware slot.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a USB interface, a Fibre Channel interface, a Serial Attached SCSI (SAS) interface, and so forth. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals (e.g., download and commit firmware commands/requests) between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

A memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations, based on instructions stored in firmware in an active slot or associated with an active firmware slot, such as wear leveling operations, garbage collection operations, error detection and ECC operations, decoding operations, encryption operations, caching operations, address translations between a LBA and a physical block address that are associated with the memory components 112A to 112N, and address translations between an application identifier received from the host system 120 and a corresponding zone of a set of zones of the memory components 112A to 112N. This translation can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a firmware slot manager 122 that performs or facilitates firmware slot management operations, in accordance with some embodiments described herein. In some embodiments, the controller 115 includes at least a portion of the firmware slot manager 122. For example, the controller 115 can include a processor 117 (processing device) configured to execute instructions stored in local memory 119 for performing the operations described herein. In some embodiments, the firmware slot manager 122 is part of the host system 120, such as a software application or an operating system on the host system 120.

According to some embodiments, the memory sub-system 110 can receive, from the host system 120, a request to update firmware stored in the firmware slot manager 122 or elsewhere in the memory sub-system controller 115. Specifically, the memory sub-system controller 115 can store a data structure that includes an active firmware slot and one or more firmware slots. Each of the one or more firmware slots can store a different version of firmware, such as by storing a respective image of the firmware or link to the image of the firmware. The active firmware slot stores an identifier of one of the one or more firmware slots that is used as the currently active firmware to boot and operate the memory sub-system 110. In some cases, the request to update the firmware includes a download command that includes an image of new firmware or separate chunks of the image of the new firmware. The download command and associated information is provided to the firmware slot manager 122.

In some cases, the firmware slot manager 122 receives the image including a firmware update with instructions for operating the memory sub-system and, in response, performs a verification process on the image. The verification process can be performed on the image as a whole or on individual chunks that collectively form the image. After verifying the image, the firmware slot manager 122 stores the image in a segment of the set of memory components 112A to 112N based on a result of performing the verification process. Later, the firmware slot manager 122 receives a request to commit the image, where the request includes an identifier (e.g., slot number) of one of the one or more firmware slots in which to store the firmware image. In response to receiving the request to commit the image, the firmware slot manager 122 performs quiescing and transition operations after confirming that the image was successfully verified and stores a link, in the firmware slot corresponding to the identifier (e.g., the slot number), to the segment of the set of memory components 112A to 112N in which the image is stored.

In some examples, after storing the link to the verified image, the firmware slot manager 122 reboots the memory sub-system 110 using the instructions of the verified image of the new firmware. The firmware slot manager 122 can replace the identifier stored in the active firmware slot with the identifier of the slot specified in the commit command (e.g., corresponding to the slot in which the link to the segment of the set of memory components 112A to 112N in which the image is stored). In this way, the memory sub-system 110 is booted from the firmware stored in the set of memory components 112A to 112N.

Depending on the embodiment, the firmware slot manager 122 can comprise logic (e.g., a set of transitory or non-transitory machine instructions, such as firmware) or one or more components that causes the memory sub-system 110 (e.g., the memory sub-system controller 115) to perform operations described herein with respect to the firmware slot manager 122. The firmware slot manager 122 can comprise a tangible or non-tangible unit capable of performing operations described herein. Further details with regards to the operations of the firmware slot manager 122 are described below.

Figure 2:
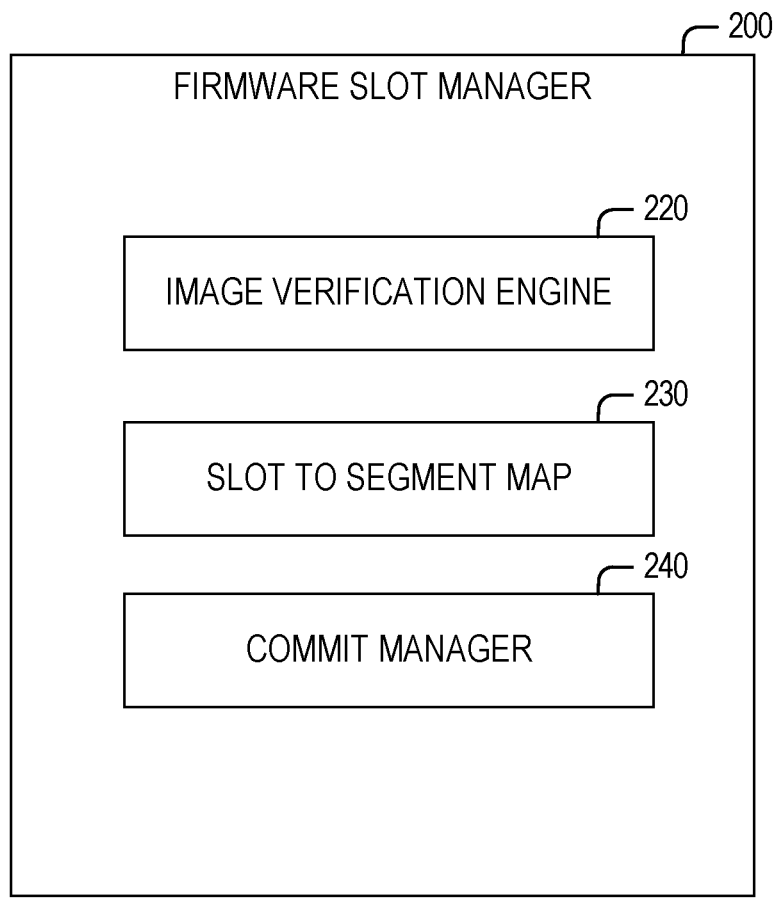
FIG. 2 is a block diagram of an example firmware slot manager, in accordance with some implementations of the present disclosure.

FIG. 2 is a block diagram of an example firmware slot manager 200, in accordance with some implementations of the present disclosure. As illustrated, the firmware slot manager 200 can include an image verification engine 220, a slot to segment map 230, and a commit manager 240. For some embodiments, the firmware slot manager 200 can differ in components or arrangement (e.g., less or more components) from what is illustrated in FIG. 2. For example, the image verification engine 200 can be external to the firmware slot manager and can be part of a firmware download manager component of the memory sub-system controller 115.

In some examples, the firmware slot manager 200 receives an image that includes a new or updated firmware from a host. The firmware slot manager 200 can receive the image as a single file or in multiple individual separate chunks. In case of receiving the image as a single file, the image verification engine 220 is applied to the single file to perform image verification of the image file. For example, the image verification engine 220 can apply a decryption algorithm or other security protocol to verify the authenticity of the image file. In an embodiment, the image verification engine 220 applies an RSA encryption/decryption technique in an attempt to successfully decrypt the contents of the image file to unpack the image file. Concurrently or after performing the security check, the image verification engine 220 performs a checksum, such as Secure Hash Algorithm (SHA) checksum to check the integrity of the image file. Any other alternative or additional image verification techniques can be employed on the image file. The image verification engine 220 can store the results of performing the verification of the image file in a verification buffer.

In some cases, the slot to segment map 230 accesses storage resources of the set of memory components 112A to 112N to obtain a storage segment for storing the image file. Namely, the slot to segment map 230 can hold a certain group of the set of memory components 112A to 112N in an allocated state or list. In response to receiving input from the image verification engine 220 that the verification of the image file was successful, the slot to segment map 230 can store the image file in the allocated storage segment of the set of memory components 112A to 112N. At a later time, when a commit request is received from a host, the storage location of the allocated storage segment of the set of memory components 112A to 112N in which the image file is stored becomes associated with and linked to a particular firmware slot as part of the commit and activate stages.

In some examples, the image verification file is received as separate individual chunks. The chunks can be 4 kilobytes in size and can include four chunks to provide a 16 kilobyte image file. The chunks can be of equal or unequal size. The chunks can be received in sequence or out of order. Each chunk can include a header that identifies its position or order within the total image file. The header can also include security information and parity or checksum information for the particular chunk. The image verification engine 220 can process each individual chunk in parallel or sequentially as the chunks are received. For example, the image verification engine 220 can process a first chunk by obtaining the header and performing the security and SHA checksum on the first chunk to check the image file chunk. The image verification engine 220 can store the results of the verification of the first chunk in the verification buffer or storage along with an identifier of the first chunk. Later or in parallel, the image verification engine 220 can process a second chunk by obtaining the header and performing the security and SHA checksum on the second chunk to check the image file chunk. The image verification engine 220 can store the results of the verification of the second chunk in the verification buffer or storage along with an identifier of the second chunk.

In some cases, the results of the verification of the second chunk are stored in the verification buffer separate from the verification results of the first chunk. In other cases, the results of the verification of the second chunk are combined with the results of the verification of the first chunk and stored in the verification buffer. Namely, the verification buffer can store a success or fail value for the chunks. Any chunk that provides a verification result that is a fail value can invalidate all the previous verification of the other chunks. Alternatively, if a chunk verification fails but other chunks succeed, the image verification engine 220 can request that the host re-transmit the particular chunk that failed verification.

The slot to segment map 230 can hold a certain group of the set of memory components 112A to 112N in an allocated state or list to be ready to store all of the separate chunks. In response to receiving input from the image verification engine 220 that a particular chunk of the verification of the image file was successful, the slot to segment map 230 can store that chunk of the image file in a given one of the allocated storage segment of the set of memory components 112A to 112N corresponding to the order associated with the particular chunk. For example, if the chunk is in a second position in an ordering of four chunks, the particular chunk can be stored in a second portion of the allocated storage segment of the set of memory components 112A to 112N. The chunk corresponding to the first position can be stored in a first portion of the allocated storage segment of the set of memory components 112A to 112N that is immediately adjacent and has lower address values than the second portion. After all of the chunks are stored in the allocated storage segment of the set of memory components 112A to 112N, the image file is completely stored in the allocated storage segment of the set of memory components 112A to 112N. At a later time, when a commit request is received from a host, the storage location of the allocated storage segment of the set of memory components 112A to 112N in which all the chunks of the image file are stored becomes associated with and linked to a particular firmware slot as part of the commit and activate stages.

The commit manager 240 awaits receipt of a commit command from the host. In some examples, the commit manager 240 receives a commit command from the host that includes a slot identifier. The slot identifier uniquely specifies a firmware slot from a plurality of firmware slots. In response to receiving the commit command, the commit manager 240 performs operations to store a current state of the current firmware, associate the current state of current firmware with the new image file which was previously received and downloaded and stored in the set of memory components 112A to 112N, and perform a reboot operation using the firmware of the new image file which was previously received and downloaded and stored in the set of memory components 112A to 112N.

For example, the commit manager 240 can generate a snapshot of the current firmware state by performing quiescing operations. The current firmware state corresponds to the current firmware instructions being used to operate the memory sub-system 110. The snapshot can include queue information and data structures associated with the current firmware. The commit manager 240 can access the verification results of the specified image file from the verification buffer. The commit manager 240 determines if the verification results indicate that the image file was previously successfully verified. In response to determining that the image file was not successfully verified, the commit manager 240 prevents association of the slot corresponding to the slot identifier with the previously downloaded image file. The commit manager 240 terminates the firmware update and commit process and ends activation. The commit manager 240 can inform or transmit a communication to the host indicating failure to perform the commit operations.

In response to determining that the image file was successfully verified by accessing the verification buffer, the commit manager 240 instructs the slot to segment map 230 to update the firmware slot associated with the slot identifier with a link or association to the image file stored in the allocated storage segment of the set of memory components 112A to 112N. The slot to segment map 230 replaces a current value or link stored in the specified firmware slot with the link, address, or contents of the image file stored in the allocated storage segment of the set of memory components 112A to 112N. Concurrently or thereafter, the commit manager 240 initiates quiesce and transition operations to associate the snapshot of the previously active firmware with the newly activated firmware that is referenced by the specified firmware slot. The commit manager 240 instructs the slot to segment map 230 to store the identifier of the firmware slot in the active firmware slot portion and performs a reboot operation of the memory sub-system 110. During the reboot operation, the memory sub-system 110 accesses the active firmware slot to retrieve the image file and/or firmware from the allocated storage segment of the set of memory components 112A to 112N.

Figure 3:
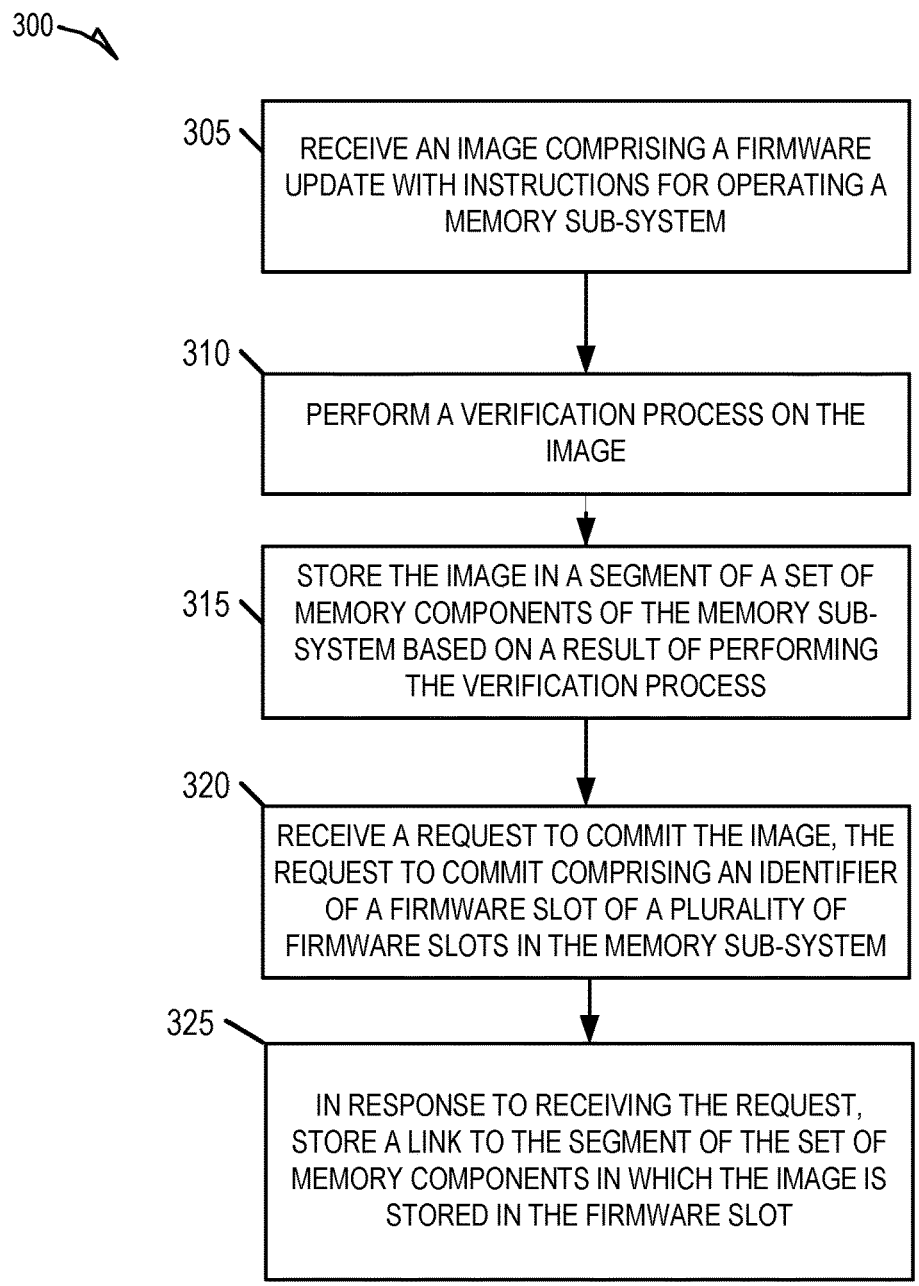
FIGS. 3-5 are flow diagrams of example methods to perform firmware slot management, in accordance with some implementations of the present disclosure.
Figure 4:
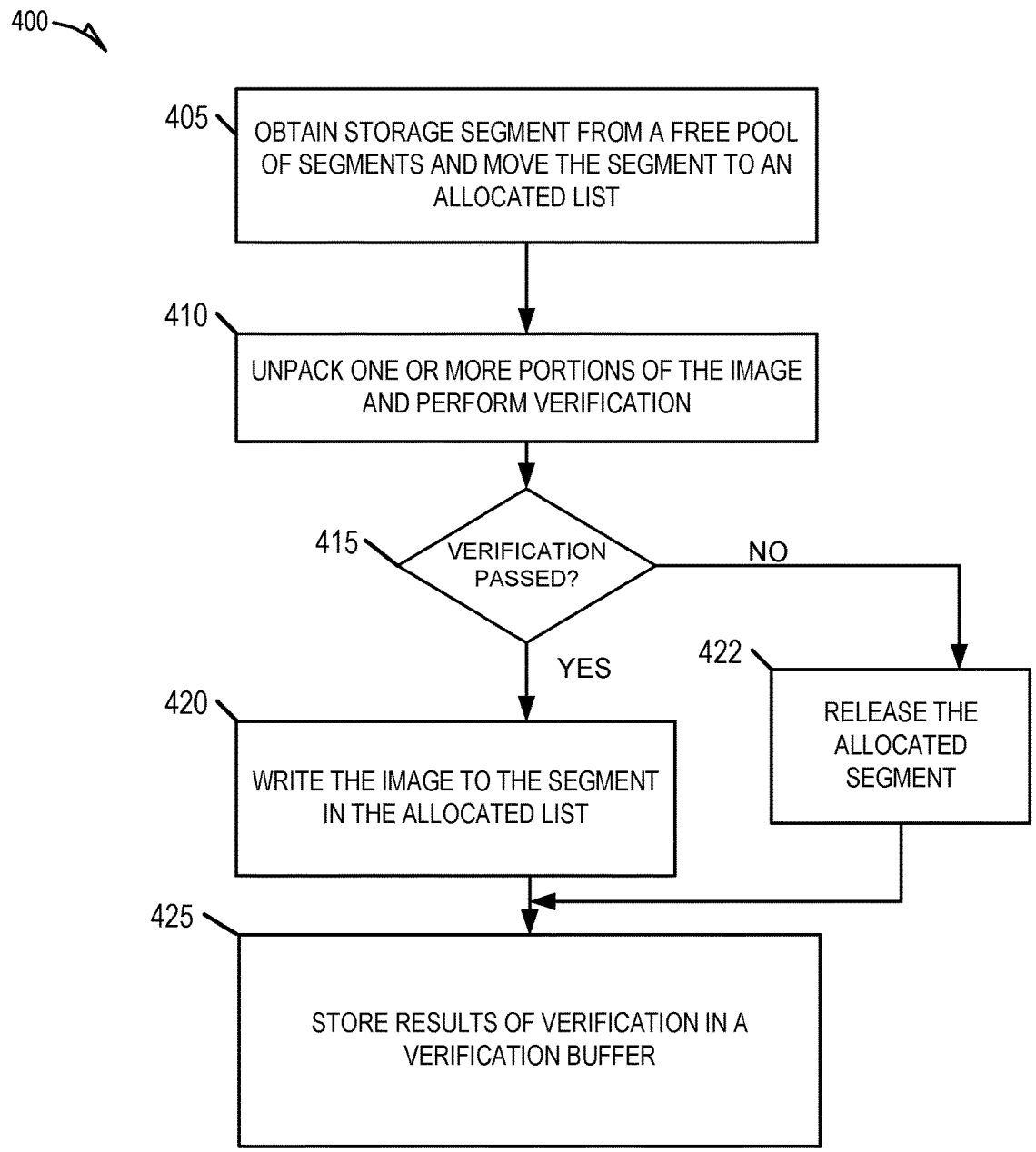
Figure 5:
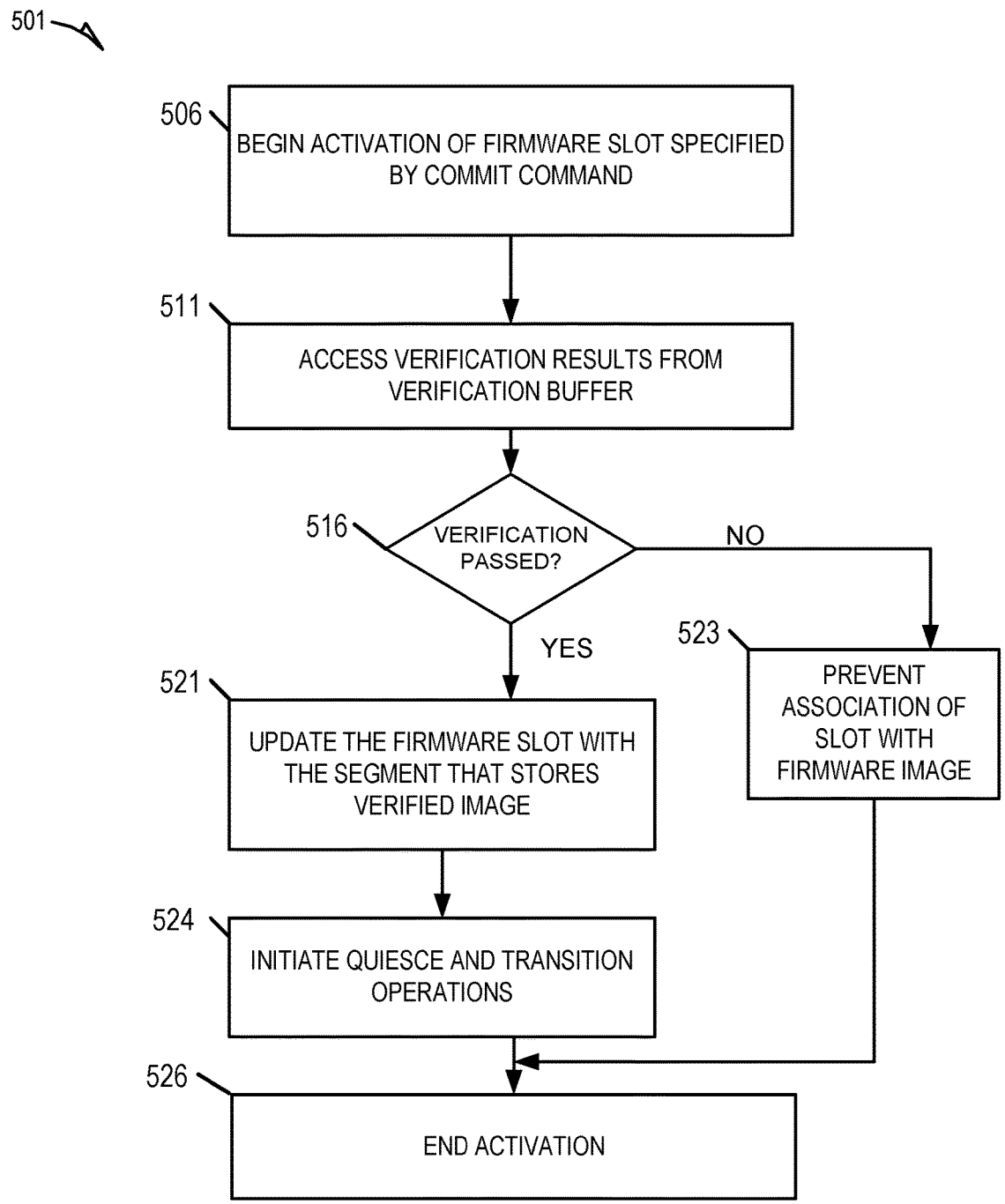

FIGS. 3-5 are flow diagrams of example methods 300-500 to perform firmware slot management, in accordance with some implementations of the present disclosure. Methods 300-500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the methods 300-500 are performed by the memory sub-system controller 115 of FIG. 1. In these embodiments, the methods 300-500 can be performed, at least in part, by the firmware slot manager 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method (or process) 300 begins at operation 305, with a processing device of a memory sub-system (e.g., of processor of the memory sub-system controller 115) receiving an image including a firmware update with instructions for operating the memory sub-system 110. For some embodiments, the image is from a download command from a host system (e.g., the host system 120) communicatively coupled to the memory sub-system 110.

At operation 310, the processing device of the memory sub-system, in response to receiving the image at operation 305, performs a verification process on the image. Thereafter, at operation 315, the processing device of the memory sub-system stores the image in a segment of the set of memory components 112A to 112N based on a result of performing the verification process.

The processing device of the memory sub-system, at operation 320, after performing the verification process on the image, receives a request to commit the image, the request to commit comprising an identifier of a firmware slot of a plurality of firmware slots in the memory sub-system 110. Then, the processing device of the memory sub-system, at operation 325, in response to receiving the request, stores a link to the segment of the set of memory components 112A to 112N in which the image is stored in the firmware slot.

Referring now FIG. 4, the method (or process) 400 of downloading an image of a firmware in response to a download command begins at operation 405, with a processing device of a memory sub-system (e.g., of processor of the memory sub-system controller 115) obtaining a storage segment from a free pool of segments and moving the segment to an allocated list. Then, at operation 410, the processing device of a memory sub-system unpacks one or more portions of the image and performs a verification process. The processing device of a memory sub-system, at operation 415, checks if the verification process completed successfully. If so, the processing device of a memory sub-system performs operation 420 and if not, the processing device of a memory sub-system performs operation 422.

At operation 422, the processing device of a memory sub-system releases the allocated segment back to the free pool of segments. The processing device of a memory sub-system, at operation 420, writes the verified image to the segment in the allocated list, such as by writing the segment to the set of memory components 112A to 112N. Thereafter, at operation 425, the processing device of a memory sub-system stores the results of the verification process in a verification buffer.

Referring now FIG. 5, the method (or process) 500 of committing an image of a firmware in response to a commit command begins at operation 506, with a processing device of a memory sub-system (e.g., of processor of the memory sub-system controller 115) beginning activation of a firmware slot specified by a commit command. Then, at operation 511, the processing device of a memory sub-system accesses the verification results from the verification buffer associated with the image and, at operation 516, checks if the verification processed completed successfully. If so, the processing device of a memory sub-system performs operation 521 and if not, the processing device of a memory sub-system performs operation 523.

At operation 523, the processing device of a memory sub-system prevents association of the firmware slot with the firmware image, such as by not linking the slot to the segment in which the firmware image is stored. The processing device of a memory sub-system, at operation 521, updates the firmware slot with the segment that stores the verified image, such as by updating a table that associates firmware slots with their respective images of firmware or links to firmware images. The processing device of a memory sub-system, at operation 524, initiates quiesce and transition operations to prepare the newly activated firmware image to be used in a boot process of the memory sub-system 110. At operation 526, the processing device of a memory sub-system ends the activation process.

Figure 6:
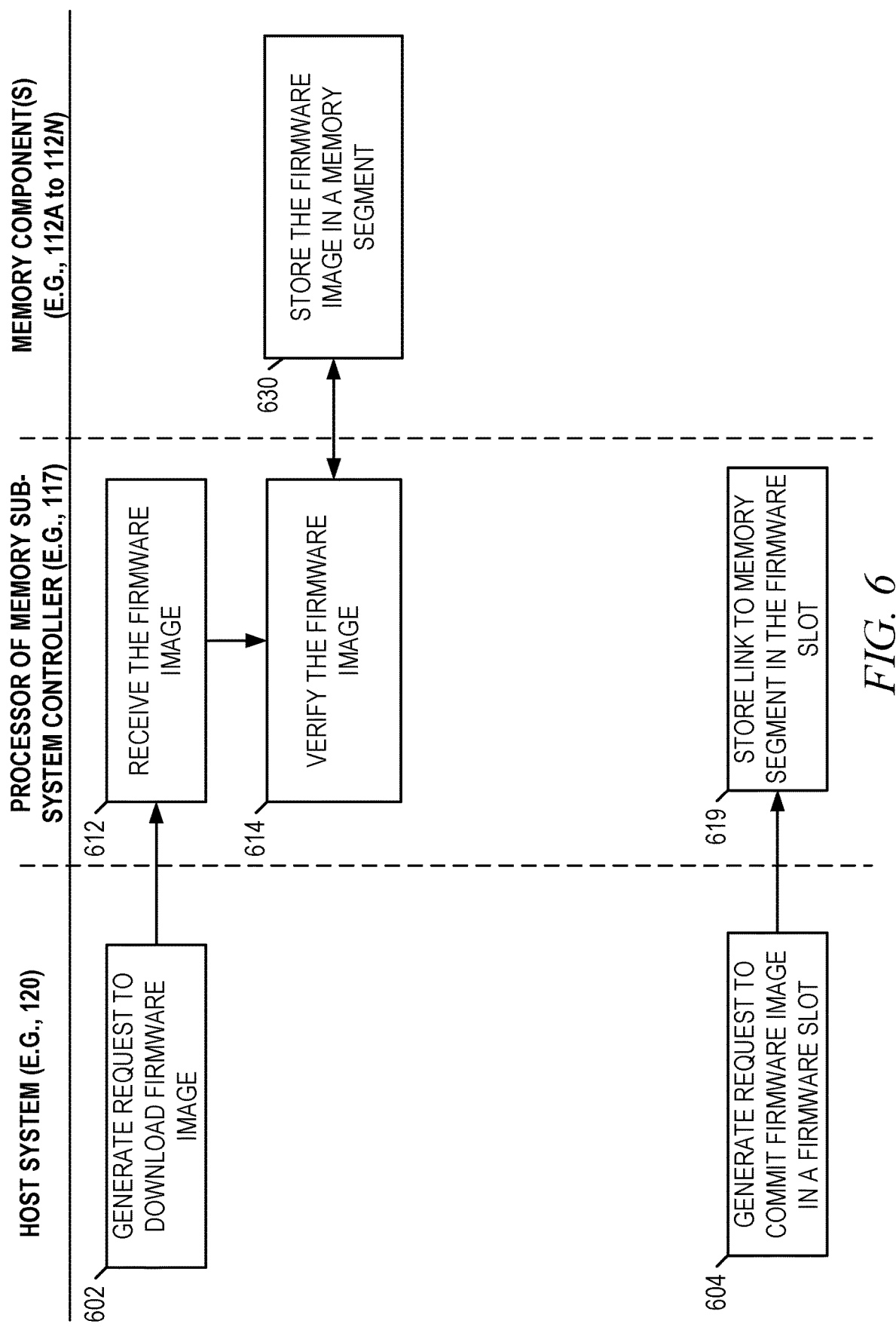
FIG. 6 provides an interaction diagram illustrating interactions between components of the computing environment in the context of some embodiments in which a method performs firmware slot management.

FIG. 6 provides an interaction diagram illustrating interactions between components of the computing environment 100 in the context of some embodiments in which a method (or process) performs firmware slot management. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 6, the host system can comprise the host system 120, the processor of the memory sub-system controller can comprise the processor 117 of the memory sub-system 110, and the one or more memory components can comprise at least one of the memory components 112A to 112N.

As shown in FIG. 6, at operation 602, the host system (e.g., via a processor of the host system 120) generates a request to download a firmware image. At operation 612, the processor of the memory sub-system controller receives the firmware image (in whole or in multiple separate chunks) and stores the image (or the chunks) in a buffer. The processor of the memory sub-system controller, at operation 614, verifies the firmware image and, if the firmware image verification is successful, at operation 630, the processor of the memory sub-system controller stores or writes the firmware image to a segment of a set of memory components (e.g., the memory components 112A to 112N).

At operation 604 the host system (e.g., via a processor of the host system 120) generates a request to commit the firmware image in a firmware slot (e.g., firmware slot 2). Then, at operation 619, the processor of the memory sub-system controller stores a link to the image stored in the memory segment of the set of memory components (e.g., the memory components 112A to 112N) in the firmware slot (e.g., slot 2). Subsequently, the processor of the memory sub-system controller re-boots the memory sub-system 110 using the image stored in the memory segment of the set of memory components (e.g., the memory components 112A to 112N).

In view of the disclosure above, various examples are set forth below. It should be noted that one or more features of an example, taken in isolation or combination, should be considered within the disclosure of this application.

Example 1: a system comprising: a memory sub-system comprising a set of memory components; and a processing device, operatively coupled to the set of memory components, configured to perform operations comprising: receiving an image comprising a firmware update with instructions for operating the memory sub-system; performing a verification process on the image, in some cases in response to receiving the image; storing the image in a segment of the set of memory components based on a result of performing the verification process; after performing the verification process on the image, receiving a request to commit the image, the request to commit comprising an identifier of a firmware slot of a plurality of firmware slots in the memory sub-system; and in response to receiving the request, storing a link to the segment of the set of memory components in which the image is stored in the firmware slot.

Example 2, the system of Example 1 wherein each of the plurality of firmware slots is configured to store a different firmware version with different instructions for operating the memory sub-system.

Example 3, the system of Examples 1 or 2, the operations comprising storing the identifier of the firmware slot in an active slot to activate the firmware update.

Example 4, the system of Example 3, the operations comprising rebooting the memory sub-system, wherein during rebooting the memory sub-system the processing device reads the active slot to obtain the firmware update from which to boot the memory sub-system.

Example 5, the system of any one of Examples 1-4, wherein the image is received in response to receiving a Non-Volatile Memory Express (NVMe) download command from a host.

Example 6, the system of Example 5, wherein the request to commit comprises a NVMe commit command received from the host.

Example 7, the system of any one of Examples 1-6, wherein performing the verification process on the image comprises: unpacking the image; and applying a decryption process to check security of the image.

Example 8, the system of Example 7, the operations comprising: performing a Secure Hash Algorithm (SHA) checksum to check integrity of the image.

Example 9, the system of any one of Examples 1-8, the operations comprising in response to receiving the request: performing a quiescing operation to generate a snapshot of a current firmware state being actively used to operate the memory sub-system, the snapshot comprising queue information and data structures associated with the current firmware.

Example 10, the system of Example 9, the operations comprising: performing a transition operation to write the snapshot to the firmware update and conduct hardware reset operations.

Example 11, the system of any one of Examples 1-10, the operations comprising: storing verification data associated with performing the verification process on the image in a buffer; and checking the verification data in response to receiving the request to commit and prior to storing the link to the segment in the firmware slot.

Example 12, the system of any one of Examples 1-11, wherein receiving the image comprising a firmware update comprises: receiving the image in a plurality of separate chunks; and performing the verification process for each of the plurality of separate chunks as each respective chunk is received.

Example 13, the system of Example 12, wherein each chunk of the plurality of separate chunks includes security information and checksum information.

Example 14, the system of Example 13, wherein performing the verification process comprises: performing a first security check and a first integrity check for a first chunk of the plurality of separate chunks based on the security information and checksum information of the first chunk; and storing in a verification buffer a first result in response to performing the first security check and the first integrity check.

Example 15, the system of Example 14, the operations comprising: performing a second security check and a second integrity check for a second chunk of the plurality of separate chunks based on the security information and checksum information of the second chunk; and combining, in the verification buffer, the first result with a second result in response to performing the second security check and the second integrity check.

Example 16, the system of any one of Examples 13-15, wherein each chunk is of equal size.

Example 17, the system of any one of Examples 13-16, wherein the plurality of separate chunks is received out of order.

Example 18, the system of Example 17, the operations comprising storing the plurality of separate chunks to a correct offset in the segment of the set of memory components based on a chunk number associated with each of the plurality of separate chunks.

Methods and computer-readable storage medium with instructions for performing any one of the above Examples.

Figure 7:
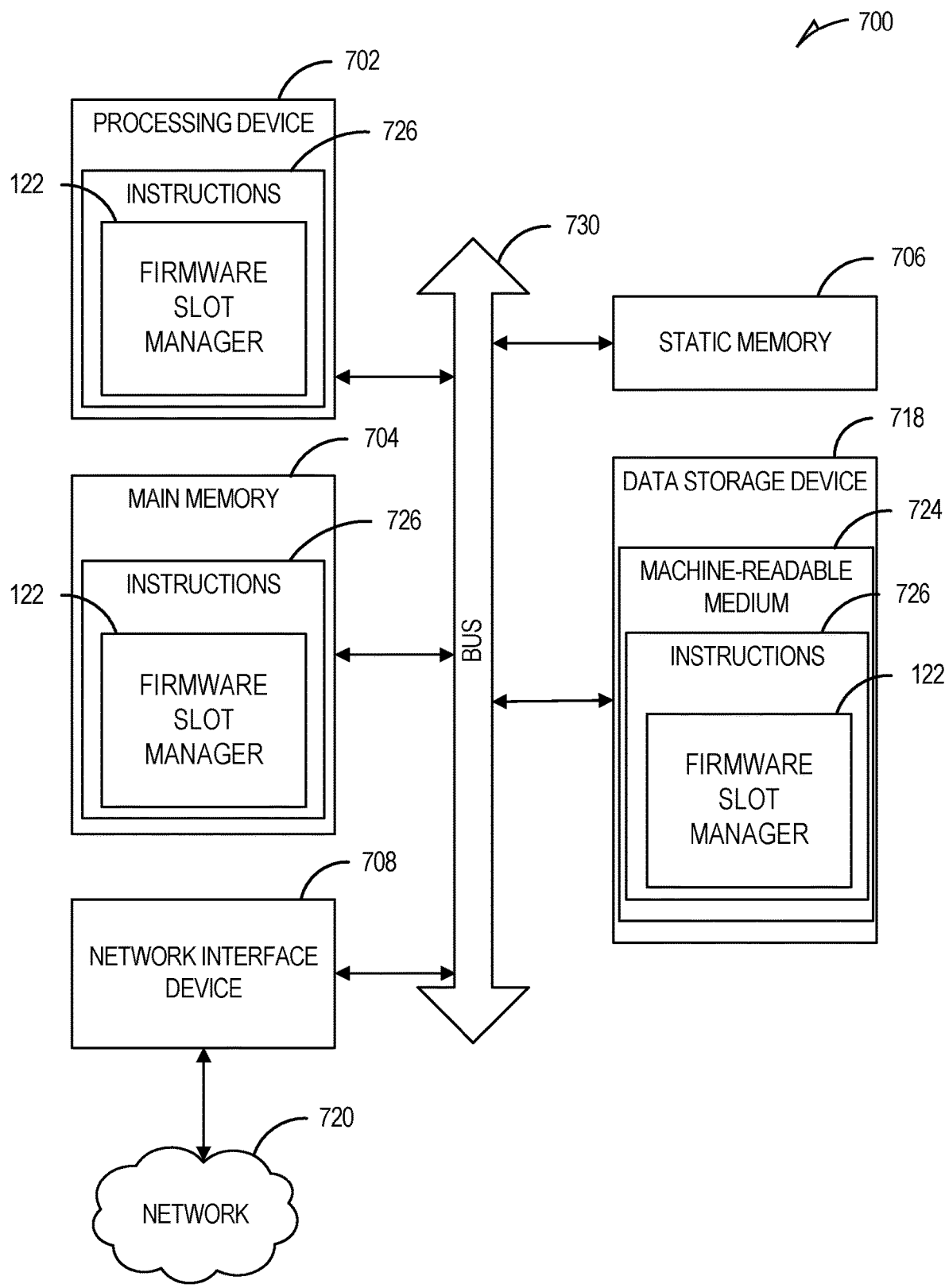
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the firmware slot manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to firmware slot manager (e.g., the firmware slot manager 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:
   a memory sub-system comprising a set of memory components, the memory sub-system comprising an active firmware slot and a plurality of additional firmware slots, the active firmware slot storing an identifier of one of the plurality of additional firmware slots that is used as a currently active firmware to boot and operate the memory sub-system; and
   a processing device, operatively coupled to the set of memory components, programmed to perform operations comprising:
   receiving an image comprising a firmware update with instructions for operating the memory sub-system as a plurality of chunks;
   performing a verification process on first and second chunks of the plurality of chunks separately, the first chunk being verified prior to the second chunk;
   determining that verification of the second chunk of the plurality of chunks fails;
   in response to determining that verification of the second chunk of the plurality of chunks fails, invalidating verification of the first chunk that was verified previous to the second chunk;
   storing the image in a segment of the set of memory components based on a result of performing the verification process;
   after performing the verification process on the image, receiving, from a host, a request to commit the image, the request to commit received from the host comprising a slot number that uniquely identifies in which of the plurality of additional firmware slots in the memory sub-system to store the image, the slot number corresponding to an individual firmware slot of the plurality of additional firmware slots;
   in response to receiving the request, storing a link to the segment of the set of memory components in which the image is stored in the individual firmware slot corresponding to the slot number in the request to commit from the host; and
   replacing the identifier stored in the active firmware slot with the identifier of the individual firmware slot comprising the slot number included in the request to commit.

2. The system of claim 1, wherein each of the plurality of additional firmware slots is configured to store a different firmware version with different instructions for operating the memory sub-system.

3. The system of claim 1, the operations comprising storing the identifier of the individual firmware slot in the active firmware slot to activate the firmware update.

4. The system of claim 3, the operations comprising rebooting the memory sub-system, wherein during rebooting the memory sub-system the processing device reads the active firmware slot to obtain the firmware update from which to boot the memory sub-system.

5. The system of claim 1, wherein the image is received in response to receiving a Non-Volatile Memory Express (NVMe) download command from a host.

6. The system of claim 5, wherein the request to commit comprises a NVMe commit command received from the host.

7. The system of claim 1, wherein performing the verification process on the image comprises:
   unpacking the image; and
   applying a decryption process to check security of the image.

8. The system of claim 7, the operations comprising:
   performing a Secure Hash Algorithm (SHA) checksum to check integrity of the image.

9. The system of claim 1, the operations comprising, in response to receiving the request:
   performing a quiescing operation to generate a snapshot of a current firmware state being actively used to operate the memory sub-system, the snapshot comprising queue information and data structures associated with the current firmware state.

10. The system of claim 9, the operations comprising:
    performing a transition operation to write the snapshot to the firmware update and conduct hardware reset operations.

11. The system of claim 1, the operations comprising:
    storing verification data associated with performing the verification process on the image in a buffer;
    checking, by the memory sub-system, the verification data in response to the memory sub-system receiving the request to commit from a host and prior to storing the link to the segment in the individual firmware slot; and
    preventing, by the memory sub-system, association of the individual firmware slot with the image, in response to receiving the commit from the host, based on determining by the memory sub-system that the verification data indicates failure of the verification process.

12. The system of claim 1, wherein receiving the image comprising a firmware update comprises:

performing the verification process for each of the plurality of chunks as each respective chunk is received.

13. The system of claim 1, wherein each chunk of the plurality of chunks includes security information and checksum information.

14. The system of claim 13, wherein performing the verification process comprises:
performing a first security check and a first integrity check for the first chunk of the plurality of chunks based on the security information and checksum information of the first chunk; and
storing in a verification buffer a first result in response to performing the first security check and the first integrity check, the verification buffer storing a fail value for the first chunk.

15. The system of claim 14, the operations comprising:
performing a second security check and a second integrity check for the second chunk of the plurality of chunks based on the security information and checksum information of the second chunk; and
combining, in the verification buffer, the first result with a second result in response to performing the second security check and the second integrity check.

16. The system of claim 13, wherein each chunk is of equal size.

17. The system of claim 1, the operations comprising:
determining that the first chunk fails verification and that a third chunk is successfully verified; and
in response to determining that the first chunk fails verification and that the third chunk is successfully verified, requesting that a host re-transmit the first chunk that failed verification.

18. The system of claim 1, the operations comprising:
allocating a storage segment of the set of memory components to be ready to store the plurality of chunks;
receiving verification that a particular chunk of the plurality of chunks was successfully verified;
determining a position in ordering of the plurality of chunks for the particular chunk;
in response to receiving verification that the particular chunk of the plurality of chunks was successfully verified, storing the particular chunk in a portion of the previously allocated storage segment corresponding to the determined position, wherein chunks with sequential positions in the ordering are stored in adjacent portions of the previously allocated storage segment; and
linking the previously storage segment to a particular firmware slot in response to receiving the commit request using a storage location of the storage segment.

19. A method comprising:
receiving an image comprising a firmware update with instructions for operating a memory sub-system as a plurality of chunks, the memory sub-system comprising an active firmware slot and a plurality of additional firmware slots, the active firmware slot storing an identifier of one of the plurality of additional firmware slots that is used as a currently active firmware to boot and operate the memory sub-system;
performing a verification process on first and second chunks of the plurality of chunks separately, the first chunk being verified prior to the second chunk;
determining that verification of the second chunk of the plurality of chunks fails;
in response to determining that verification of the second chunk of the plurality of chunks fails, invalidating verification of the first chunk that was verified previous to the second chunk;
storing the image in a segment of a set of memory components of the memory sub-system based on a result of performing the verification process;
after performing the verification process on the image, receiving, from a host, a request to commit the image, the request to commit received from the host comprising a slot number that uniquely identifies in which of the plurality of additional firmware slots in the memory sub-system to store the image, the slot number corresponding to an individual firmware slot of the plurality of additional firmware slots;
in response to receiving the request, storing a link to the segment of the set of memory components in which the image is stored in the individual firmware slot corresponding to the slot number in the request to commit from the host; and
replacing the identifier stored in the active firmware slot with the identifier of the individual firmware slot comprising the slot number included in the request to commit.

20. A non-transitory computer-readable storage medium comprising instructions that, when executed by a processing device, cause the processing device to perform operations comprising:
receiving an image comprising a firmware update with instructions for operating a memory sub-system as a plurality of chunks, the memory sub-system comprising an active firmware slot and a plurality of additional firmware slots, the active firmware slot storing an identifier of one of the plurality of additional firmware slots that is used as a currently active firmware to boot and operate the memory sub-system;
performing a verification process on first and second chunks of the plurality of chunks separately, the first chunk being verified prior to the second chunk;
determining that verification of the second chunk of the plurality of chunks fails;
in response to determining that verification of the second chunk of the plurality of chunks fails, invalidating verification of the first chunk that was verified previous to the second chunk;
storing the image in a segment of a set of memory components of the memory sub-system based on a result of performing the verification process;
after performing the verification process on the image, receiving, from a host, a request to commit the image, the request to commit received from the host comprising a slot number that uniquely identifies in which of the plurality of additional firmware slots in the memory sub-system to store the image, the slot number corresponding to an individual firmware slot of the plurality of additional firmware slots;
in response to receiving the request, storing a link to the segment of the set of memory components in which the image is stored in the individual firmware slot corresponding to the slot number in the request to commit from the host; and
replacing the identifier stored in the active firmware slot with the identifier of the individual firmware slot comprising the slot number included in the request to commit.

* * * * *